US010836881B2

(12) United States Patent
Lin et al.

(10) Patent No.: US 10,836,881 B2
(45) Date of Patent: Nov. 17, 2020

(54) PUMPABLE AND THERMALLY EXPANDABLE FILLER COMPOSITIONS

(71) Applicant: SIKA TECHNOLOGY AG, Baar (CH)

(72) Inventors: Geng Lin, Rochester Hills, MI (US); Blanka Proko, Macomb Township, MI (US); Steve Davis, Rochester, MI (US)

(73) Assignee: SIKA TECHNOLOGY AG, Baar (CH)

( * ) Notice: Subject to any disclaimer, the term of this patent is extended or adjusted under 35 U.S.C. 154(b) by 417 days.

(21) Appl. No.: 15/671,977

(22) Filed: Aug. 8, 2017

(65) Prior Publication Data

US 2018/0037708 A1 Feb. 8, 2018

(30) Foreign Application Priority Data

Aug. 8, 2016 (EP) .................................... 16183251

(51) Int. Cl.
| | | |
|---|---|---|
| B29C 44/34 | (2006.01) | |
| B60R 13/08 | (2006.01) | |
| C08J 9/10 | (2006.01) | |
| C08J 9/00 | (2006.01) | |
| C08L 63/00 | (2006.01) | |
| B29C 44/18 | (2006.01) | |
| B29C 44/42 | (2006.01) | |
| C08J 9/228 | (2006.01) | |
| C08K 3/26 | (2006.01) | |
| B29K 27/06 | (2006.01) | |
| B29K 63/00 | (2006.01) | |
| B29L 31/30 | (2006.01) | |

(52) U.S. Cl.
CPC ............... *C08J 9/107* (2013.01); *B29C 44/18* (2013.01); *B29C 44/3415* (2013.01); *B29C 44/42* (2013.01); *B60R 13/0815* (2013.01); *C08J 9/0061* (2013.01); *C08J 9/228* (2013.01); *C08K 3/26* (2013.01); *C08L 63/00* (2013.01); *B29K 2027/06* (2013.01); *B29K 2063/00* (2013.01); *B29L 2031/30* (2013.01); *C08J 9/103* (2013.01); *C08J 9/105* (2013.01); *C08J 2201/022* (2013.01); *C08J 2201/026* (2013.01); *C08J 2201/038* (2013.01); *C08J 2203/04* (2013.01); *C08J 2309/06* (2013.01); *C08J 2363/02* (2013.01); *C08J 2409/06* (2013.01); *C08J 2427/06* (2013.01); *C08J 2433/06* (2013.01); *C08J 2463/02* (2013.01); *C08K 2003/265* (2013.01)

(58) Field of Classification Search
CPC ..... B29C 44/3415; B29C 44/42; B29C 44/18; C08J 9/228
See application file for complete search history.

(56) References Cited

U.S. PATENT DOCUMENTS

| | | | | |
|---|---|---|---|---|
| 2,965,586 | A | | 12/1960 | Fisch et al. |
| 3,432,449 | A | * | 3/1969 | Deal ....................... C08J 9/0023 521/74 |
| 3,765,972 | A | * | 10/1973 | Wesp ..................... C09J 133/12 156/71 |
| 10,590,256 | B2 | * | 3/2020 | Hopkins ................ C08G 77/20 |
| 2002/0115737 | A1 | * | 8/2002 | Freitag ................... C08J 9/0061 521/135 |
| 2004/0044147 | A1 | * | 3/2004 | Kamae ................... C08G 59/18 525/523 |
| 2004/0266898 | A1 | * | 12/2004 | Kassa ................... C08J 9/0061 521/134 |
| 2006/0142403 | A1 | * | 6/2006 | Sugiura ................ B62D 29/002 521/134 |
| 2006/0188726 | A1 | * | 8/2006 | Muenz ................... C08J 9/0061 428/413 |
| 2009/0130316 | A1 | * | 5/2009 | Billast ..................... C08L 27/06 427/374.1 |
| 2009/0131556 | A1 | * | 5/2009 | Honda ................... C08G 59/42 523/207 |
| 2013/0280451 | A1 | | 10/2013 | Kobayashi et al. | |

FOREIGN PATENT DOCUMENTS

| | | |
|---|---|---|
| EP | 0 500 009 A1 | 8/1992 |
| EP | 0 899 300 A2 | 3/1999 |
| EP | 1 632 523 A1 | 3/2006 |
| JP | H05-059345 A | 3/1993 |
| JP | H07-256808 A | 10/1995 |
| WO | 03/054069 A1 | 7/2003 |

OTHER PUBLICATIONS

Feb. 9, 2017 Extended Search Report issued in European Patent Application No. 16183251.4.

* cited by examiner

*Primary Examiner* — Nahida Sultana
(74) *Attorney, Agent, or Firm* — Oliff PLC

(57) ABSTRACT

Pumpable thermally foaming filler compositions based on combinations of a liquid epoxy resin and a polyvinyl chloride resin and/or an acrylic resin powder. The pumpable filler materials provide the advantage that they can be applied as needed using conventional injection equipment and can be expanded to provide foam with good physical strength, high expansion and excellent adhesion on oiled metal substrates. Methods for filling closed spaces with the pumpable thermally foaming filler composition as well as vehicle parts are obtainable with the indicated methods.

9 Claims, No Drawings

PUMPABLE AND THERMALLY EXPANDABLE FILLER COMPOSITIONS

TECHNICAL FIELD

The present invention relates to a pumpable thermally foaming filler composition and in particular relates to a pumpable thermally foaming filler composition which is suitable for forming an insulation material for blocking noise during the operation of a vehicle when charged into closed sections of vehicle body members such as a pillar of a vehicle and then foamed by the heat of a baking process.

BACKGROUND ART

Heretofore in order to improve the insulation properties of automobiles against noise and in particular to block wind noise two component pumpable polyurethanes and other materials have been used which are foamed into a predetermined shape beforehand and then inserted into closed sections such as a front pillar (A pillar), a centre pillar (B pillar), a rear pillar (C pillar), a wheel arch (tire house) or a side sill. However, this method is difficult to implement in automotive OEMs due to the complexities of application equipment and application process. Some small area cavities could not be accessed with applicators.

Another type an insulation/enforcing material is a part baffle which can manually be applied to an automobile part in an unfoamed state and be foamed and expanded during the OEM bake process. These thermoplastic baffles include commercial products such as SikaBaffle 255 or SikaBaffle 450, which can be expanded to about 1000 to 2000% of their volume prior to foaming.

A yet further type of isolation/enforcing material is a tape baffle, such as SikaBaffle 229, which exhibits a volume expansion of about 800%. The downside of the above-described part or tape baffle technologies is that the materials have to be applied manually. Robot applications are more desirable in OEMs.

A new approach to overcome the difficulties associated with pre-foamed insulation baffles is to use pumpable baffle materials which can be applied and metered by means of an injection nozzle and thus can be easily used "according to the requirements". For example, JP H05-59345 discloses a paste-like thermally foaming filler containing a liquid rubber, an unvulcanised rubber, a vulcanizing agent, a vulcanizing accelerator, a softener, a foaming agent, a foaming auxiliary agent, a scale-like inorganic filler and a thixotropic agent as a paste-type thermally foaming filler, which can automatically be applied by a machine, has good adhesiveness to oil-coated steel and has thixotropic properties.

EP 1 632 523 A1 discloses an automatic application type paste-like thermally foaming filler composition containing a partially crosslinked rubber, an unvulcanised rubber, a cross-linking agent, a plasticizer, a thermoplastic resin, an epoxy resin and latent curing agent thereof, and a the foaming agent. These paste-like thermally foaming fillers can be applied automatically and do not require a different specification for each car type or each part. In addition the compositions of EP 1 632 523 A1 can form an insulation material which blocks wind noise during the operation of the car when applied into closed section spaces of a vehicle by robot application and foamed therein by a baking process after the application.

US 2013/280451 A1 describes a paste-like thermally expandable filler which is based on an uncrosslinked rubber, a quinone-based vulcanizing agent and a foaming agent in particular in the form of expandable balloons. This material in comparison to the materials described, e.g., in EP 1 632 523 A1 has the advantage that it can be foamed at lower temperatures compared to the state of the art and has expansions of up to about 850% when foamed in a closed space. In addition, it has been shown that a thermally foaming filler with good shower resistance is obtained when the content of the uncrosslinked rubber and/or a partially crosslinked rubber is set to 8 parts by weight.

Despite of these developments, there is a need for a pumpable and thermally expandable material, especially for automotive OEM (original equipment manufacturer) applications which is based on a chemistry different from rubber. This alternative material should nonetheless have the advantageous properties of the material, e.g., described in US 2013/280451 A1, i.e. it should have high volume expansion rates of up to about 900%, provide a good physical strength and good adhesion on oiled metal substrates.

The present application addresses these needs.

DESCRIPTION OF THE INVENTION

In a first aspect, the present application is directed at a pumpable thermally foaming filler composition comprising:
a liquid epoxy resin,
a polyvinylchloride resin or acrylic resin powder,
and a foaming agent.

The liquid epoxy resin is a material which is liquid or at least flowable at ambient temperature (23° C.). Polyepoxides which are known to the person skilled in the art as "reactive diluents" are also referred to in the present document as liquid epoxy resins.

Suitable liquid epoxy resins for use in the inventive composition include liquid resins of the formula (I)

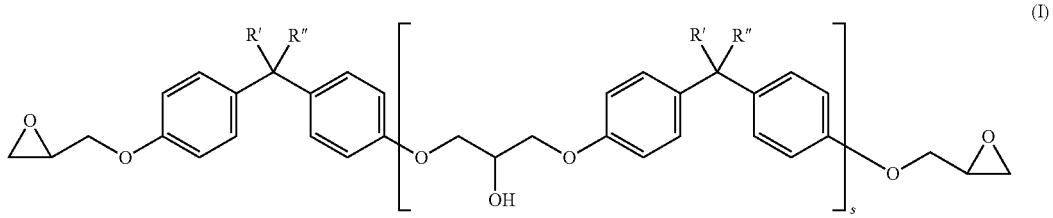

where R' and R" are each independently a hydrogen atom or a methyl group, and s has an average value of 0 to 1. Preference is given to those liquid resins of the formula (I) in which the index s has an average value of less than 0.2.

The liquid epoxy resins of the formula (I) are diglycidyl ethers of bisphenol A, bisphenol F and bisphenol A/F, where A represents acetone and F formaldehyde, which serve as reactants for preparation of these bisphenols. A bisphenol A liquid resin accordingly has methyl groups, a bisphenol F liquid resin hydrogen atoms, and a bisphenol A/F liquid resin both methyl groups and hydrogen atoms, as R' and R" in formula (I). In the case of bisphenol F, it is also possible for positional isomers to be present, especially derived from 2,4'- and 2,2'-hydroxyphenylmethane.

Such liquid epoxy resins are commercially available, for example as Araldite® GY 204, Araldite® GY 250, Araldite® GY 260, Araldite® GY 281, Araldite® GY 282, Araldite® GY 285, Araldite® PY 304, Araldite® PY 720 (from Huntsman); D.E.R.® 330, D.E.R.® 331, D.E.R.® 332, D.E.R.® 336, D.E.R.® 354, D.E.R.® 351, D.E.R.® 352, D.E.R.® 356 (from Dow); Epikote® 162, Epikote® 827, Epikote® 828, Epikote® 158, Epikote® 862, Epikote® 169, Epikote® 144, Epikote® 238, Epikote® 232, Epikote® 235 (from Hexion), Epalloy® 7190, Epalloy® 8220, Epalloy® 8230, Epalloy® 7138, Epalloy® 7170, Epalloy® 9237-70 (from CVC), Chem Res® E 20, Chem Res® E 30 (from Cognis), Beckopox® EP 1 16, Beckopox® EP 140 (from Cytec), Epiclon EXA-4850 (from Sun Chemical).

Further suitable liquid epoxy resins are the glycidylization products of dihydroxybenzene derivatives such as resorcinol, hydroquinone and catechol; further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxy-phenyl)propane, 2,2-bis(3,5-dibromo-4-hydroxy-phenyl)propane, 2,2-bis(4-hydroxy-3-tert-butyl-phenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)-heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-trimethylcyclohexane (bisphenol TMC), 1,1-bis(4-hydroxyphenyl)-1-phenyl-ethane, 1,4-bis[2-(4-hydroxyphenyl)-2-propyl]benzene) (bisphenol P), 1,3-bis[2-(4-hydroxyphenyl)-2-propyl]benzene) (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)nnethane, 1,1,2,2-tetrakis(4-hydroxyphenyl)ethane, bis(4-hydroxyphenyl)ether, bis(4-hydroxyphenyl) sulfone; condensation products of phenols with formaldehyde, which are obtained under acidic conditions, such as phenol novolacs or cresol novolacs; aromatic amines, such as aniline, toluidine, 4-aminophenol, 4,4'-methylenediphenyldiamine (MDA), 4,4'-methylenediphenyldi(N-methyl)amine, 4,4'-[1,4-phenylenebis(1-methylethylidene)]bisaniline (bisaniline P), 4,4'-[1,3-phenylenebis(1-methylethilidene)]bisaniline (bisaniline M).

In a further embodiment, the liquid epoxy ersin is an aliphatic or cycloaliphatic polyepoxide, for example diglycidyl ether; a glycidyl ether of a saturated or unsaturated, branched or unbranched, cyclic or open-chain C2 to C3 diol, for example ethylene glycol, propylene glycol, butylene glycol, hexanediol, octanediol, a polypropylene glycol, dimethylolcyclohexane, neopentyl glycol; a glycidyl ether of a tri- or tetrafunctional, saturated or unsaturated, branched or unbranched, cyclic or open-chain polyol such as castor oil, trimethylolpropane, trimethylolethane, penta-erythritol, sorbitol or glycerol, and alkoxylated glycerol or alkoxylated trimethylolpropane; a hydrogenated bisphenol A, F or A/F liquid resin, or the glycidylization products of hydrogenated bisphenol A, F or A F; an N-glycidyl derivative of amides or heterocyclic nitrogen bases, such as triglycidyl cyanurate and thglycidyl isocyanurate, and reaction products of epichlorohydrin and hydantoin.

Aliphatic or cycloaliphatic liquid epoxy resins are, for example, commercially available as Araldite® DY-C, Araldite®, DY-F, Araldite® DY-H, Araldite® DY-T, Araldite® DY 0397, Araldite® DY 3601 (from Huntsman), D.E.R.® 732, D.E.R.® 736 (from Dow); Heloxy® BD, Heloxy® HD, Heloxy® TP, Epikote® 877 (from Hexion), Beckopox® EP 075 (from Cytec). Mixtures of aliphatic or cycloaliphatic polyepoxides and aromatic epoxides of the formula (I) can also be used, such is in particular mixtures of diglycidyl ethers of bisphenol A, bisphenol F and bisphenol A/F and diglycidylethers of α,ω-alkandiols, wherein the α,ω-alkandiols preferably comprise 2 to 10 carbon atoms. Such mixtures are commercially available for example from Dow as D.E.R. 358.

In a further embodiment, the liquid epoxy resin is a polyepoxide which has been prepared from the oxidation of olefins, for example from the oxidation of vinylcyclohexene, dicyclopentadiene, cyclohexadiene, cyclododecadiene, cyclododecatriene, isoprene, 1,5-hexadiene, butadiene, polybutadiene or divinylbenzene.

The liquid epoxy resin is preferably a diepoxide Al. The diepoxide Al is more preferably selected from the group consisting of a bisphenol A, bisphenol F and bisphenol A/F diglycidyl ether having an epoxy equivalent weight of 156 to 250 g/eq, especially Araldite® GY 250, Araldite® PY 304, Araldite® GY 282 (from Huntsman); D.E.R.®, 331, D.E.R.® 330 (from Dow); Epikote® 828, Epikote®, 862 (from Hexion), N,N-diglycidylaniline and a polyglycol diglycidyl ether having an epoxy equivalent weight of 170 to 340 g/eq, especially D.E.R.® 732 and D.E.R.® 736 (from Dow). Further preferred is D.E.R.® 358 from Dow Chemical. A particularly preferred diepoxide is 1,4-butane diglycidylether sold for example as Epiol DE-200 from HAJIN CHEMTECH and Grilonit RV 1806 from EMS-GrilTech. In addition, polyalkylenglycol based di- or triepoxides may be used in admixture with the above-mentioned epoxides. Preferred polyalkylenglycol include polyalkylenglycol di- and triepoxides, which can be based on polyethylenglycol, polypropylenglycol or polyethylen/polypropylene mixed glycols. In a particularly preferred embodiment the polyalkylenglycol epoxides are polyalkylenglycol glycidyl ethers. A suitable polyalkylenglycol diepoxide is e.g. Erisys GE-24.

A particular preferred liquid epoxy resin in the context of the present application is an epoxy resin based on bisphenol A diglycidylether having an epoxy equivalent weight of 156 to 250 g/eq, such as D.E.R.® 331 from Dow.

The liquid epoxy resins are preferably included into the composition in an amount of 5 to 40 wt.-% based on the total weight of the composition. In a yet preferred embodiment, the liquid epoxy resin is incorporated into the composition in an amount of 8 to 30 wt.-% and in particular 10 to 20 wt.-%.

The polyvinylchloride (PVC) resin in the composition of the present application can be a polyvinylchloride homo- or a copolymer. If the polyvinylchloride is a copolymer it preferably comprises vinyl esters such as vinyl acetate or vinyl propionate as the comonomer to vinylchloride. The amount of the co-monomer typically ranges from about 1 to about 20%, more typically is in the range of from 2 to about 10% and most preferably about 5%, relative to the total weight of the copolymer.

A suitable PVC-homopolymer in the context of the present application is Formolon KVH from Formosa. A particularly suitable PVC copolymer in the context of the present application is Formolon F40 also from Formosa.

In a particularly preferred embodiment of the present application, the pumpable thermally foaming filler composition of the present application comprises a mixture of one or more PVC homopolymers and of one or more PVC copolymers and in particular a mixture of one PVC homopolymer and one PVC copolymer.

The acrylic resin powder, which may be used instead or in addition to the polyvinyl chloride resin, is not particularly limited, except that it is preferably solid at ambient temperature (23° C.). More preferably, the acrylic resin powder has a glass transition temperature Tg in the range of 50° C. to 120° C. and even more preferably in the range of 70° C. to 90° C. The glass transition temperature is determined by DSC. In addition, it is preferred that the acrylic resin powder is capable of forming a plastisol.

The acrylic resin in the acrylic resin powder may be a homopolymer or a copolymer. A preferred acrylic resin is a resin based on methylmethacrylate, such as those available as Dianal LP-3106 or Dianal LP-3202 for Dianal America Inc. Another commercially available acrylic resin which can be used with advantage in the present application is Kane Ace U506 from Kaneka.

The polyvinyl chloride resin or resins and/or the acrylic resin powder or powders are suitably included into the composition in an amount ranging from 5 to 40 wt.-%, preferably in an amount of 8 to 30 wt.-% and most preferably in an amount of from 10 to 20 wt.-%.

As a third mandatory ingredient, the inventive pumpable thermally foaming filler composition comprises a foaming agent. As the foaming agent for use in the invention, any substance may be used in so far as it decomposed by heating to generate a gas. As suitable foaming agents azo-compounds such as azo-dicarbonamide, nitroso compounds such as N,N-dinitrosopentamethylenetetramine and hydrazine derivatives such as diphenyl sulphone-3,3'-disulphohydrazide can be mentioned. These foaming agents may be used as one kind or as a mixture of two or more kinds thereof. In the context of the present application, dicyandiamide is particularly preferred as at least part of the foaming agent, because the degradation product thereof (ammonia) can aid the curing and crosslinking of the liquid epoxy resin.

The amount of the foaming agent in the pumpable thermally foaming filler composition of the invention is typically in the range of 2 to 10 wt.-% and preferably in the range of 3 to 6 wt.-%.

The characteristic "pumpable" of the thermally foaming filler composition of the present application is understood such, that at ambient temperature (20° C.) the filler has a viscosity which is suitable for pumping and preferably has a paste-like viscosity. The viscosity of the pumpable thermally foaming filler composition is usually in the range of about 50 to about 500 Pa.s and preferably about 50 to 500 Pa.s, when measured at 20° C. and a sheer rate of 430 sec$^{-1}$. When the viscosity is lower than 50 Pa.s, dripping can more easily occur and the shape cannot sufficiently be maintained during processing. If on the other hand, the viscosity exceeds 500 Pa.s, the workability of the material is greatly reduced.

Next to the ingredients mentioned above, the pumpable thermally foaming filler composition may contain additional ingredients.

In a preferred embodiment, the pumpable thermally foaming filler composition thus contains a rubber, in particular a synthetic rubber and preferably a partially crosslinked synthetic rubber. Exemplarily partially crosslinked rubbers for use in the inventive filler composition are diene rubbers, such as, e.g., acrylonitrile-isoprene copolymer rubber (NIR), acrylonitrile-butadiene copolymer rubber (NBR), styrene-butadiene copolymer rubber (SBR), a butadiene rubber (BR) and isoprene rubber (IR). The crosslinking may be the results of the addition of a crosslinking agent, such as divinyl benzene or sulphur. The addition of a rubber provides the advantages of improved rheological properties, sag resistance, wash-off resistance and a higher volume expansion of the resulting filler composition.

The rubber is typically incorporated into the inventive filler composition in amounts of from 1 to 20%, preferably 3 to 15 wt.-% and more preferably 5 to 10 wt.-%, relative to the total weight of the composition.

A further ingredient which can be used with advantage in the pumpable thermally foaming filler composition of the present application is a plastizicer. Therefore, the pumpable thermally foaming filler composition of the present application preferably comprises one or more plasticizers. The combination of low viscosity plasticizers and PVC and/or acrylic resin powder ensures a stable paste-like state and provides the cured material with good physical strength, good expansion rates and good resistance to water absorption after cure.

As the plasticizer, any substance may be used insofar as the polyvinylchloride can be swollen and dissolved therein. Mentioned as plasticizers are, for example, phthalate esters such as di(2-ethylhexyl)phthalate, butyl benzyl phthalate, dinonylphthalate, diisononylphthalate (DIDP), diisodecylphthalate (DIDP), diundecylphthalate, ditridecylphthalate (DTDP), diheptylphthalate and butylphthalylbutylglycolate; aliphatic dibasic acid esters such as dioctyl adipate, didecyl adipate and dioctysebacate; polyglycolbenzoic acid esters such as polyoxyethylene glycol dibenzoate and polyoxypropylene glycol dibenzoate; phosphate esters such as tributylphosphate and tricresylphosphate; hydrocarbons such as alkyl-substituted diphenyl, alkyl-substituted terphenyl, partially hydrogenated terphenyl, aromatic processing oil and pile oil. These plasticizers may be used singly or as a mixture of two or more kinds thereof. Preferred among the afore-mentioned plasticizers in the context of the present application are phthalate esters, in particular diiosnonylphthalate (DIDP), ditridecylphthalate (DTDP) and Diisodecylphthalate (DIDP).

A suitable amount of plasticizer in the context of the present application is from 5 to 40 wt.-%, preferably from 8 to 30 wt.-% and in particular 10 to 20 wt.-%, relative to the total weight of the composition.

The pumpable thermally foaming filler composition of the present application preferably also contains a curing agent for the liquid epoxy resin. As the curing agent, a latent curing agent is preferably used which provides curing by heating and can usually be activated at temperatures of between 80 to 250° C. Specific examples of the latent curing agent include dicyandiamide, 4,4'-diaminodiphenylsulphone, imidazol derivatives such as 2-N-heptadecylimidazol, iso-phthalic dihydrazide, N,N-dialkylurea derivatives, N,N-dialkyl thiourea derivatives and melamine derivatives. These curing agents may be used independently or as a mixture of two or more of them depending on the curing conditions and their properties. A particularly preferred curing agent for use in the context of the present application is dicyandiamide. In one preferred embodiment dicyandiamide is used as the sole epoxy curing agent in the composition, as it was observed that the combination of liquid epoxy resin and dicyandiamide provides mixtures which are very stable on storage.

The amount of the curing agent is preferably less than 1 wt.-%, more preferably in the range of 0.1 to 0.5 wt.-%, relative to the total weight of the composition. It has been observed that a high level of the liquid epoxy resin combined with a small amount of curing agent provides a material which is crosslinked to a suitable extent once cured and provides good expansion and adhesion properties on oiled metal substrates. In addition this system also gives good physical strength.

Next to the afore-mentioned ingredients, the pumpable thermally foaming filler composition of the present application in addition preferably comprises a filler, in particular an inorganic filler. Suitable inorganic fillers are for example calcium carbonate, silica, clay, and fly ash. These inorganic fillers may be used singly or as a mixture of two or more kinds thereof. It is also possible to use more than one modification of a filler such as e.g. different modifications of calcium carbonate.

The amount of fillers and in particular inorganic filler in the context of the present application is not particularly limited and depends on the viscosity of the composition without the filler (i.e., lower viscosity allows for a more filler to be incorporated whereas a higher viscosity without the filler only allows a low amount of filler to be incorporated) while maintaining the composition pumpable. The amount of a filler thus typically ranges from about 10 to about 55 wt.-%, preferably from about 20 to 45 wt.-% and more preferably from about 25 to 35 wt.-%, relative to the total weight of the composition.

The pumpable thermally foaming filler composition of the present application can in addition contain an appropriate amount of other additives as required, e.g., thixotropy imparting agents such as organic bentonite, fumed silica, aluminium stearate, metallic soaps, castor oil derivatives, pigments such as carbon black, titanium dioxide, zinc dioxide or other inorganic pigments, dehydrating agents such as calcium oxide and powder silica gel and/or PVC-stabilizing agents.

The amount of these additional additives is not particularly limited, however it is preferred that content does not exceed 15 wt.-%, more preferably is 10 wt.-% or less and even more preferably is 8 wt.-% or less.

In a specifically preferred embodiment of the present application the pumpable thermally foaming filler composition of the present application comprises 10 to 20 wt.-% of a liquid epoxy resin, 10 to 20 wt.-% of polyvinylchloride resins and/or acrylic resin powder, 5 to 10 wt.-% of a synthetic rubber, 3 to 6 wt.-% of a foaming agent, 0 to 20 wt.-% of a plasticizer, less than 1.5 wt.-% of a curing agent or the epoxy resin and 25 to 35 wt.-% of fillers.

The pumpable thermally foaming filler composition of the invention can be produced by mixing the ingredients mentioned above by a mixer. The type of the mixer to be used is not particularly limited and includes, for example, various mixers such as a planetary mixer and a kneader.

In a second aspect, the invention is directed at a foamed filler which is obtainable by heating the pumpable thermally foaming filler composition as described above to a temperature above the activating temperature of the foaming agent. Preferably, the temperature to which the pumpable thermally foaming filler composition is heated should not exceed 210° C. and in particular should be in the range of about 140 to 200° C. and more preferably 155 to 200° C.

In addition, it is preferred that the foamed filler has an expansion of more than 300%, relative to is volume in the unfoamed state, and preferably more than 400%. On the other hand, it is preferred that the expansion should not exceed 1000% and in particular should not exceed 900% of its unfoamed volume. In a particular preferred embodiment, the filler has an expansion of from about 500% to 900%.

The pumpable thermally foaming filler composition can be used with advantage to be applied (e.g. by extrusion) robotically into closed spaces and expanded therein to provide a foam which isolates from noise. Therefore, in one aspect the present invention is also directed at a use of the pumpable thermally foaming filler composition as described above as a filler for closed spaces and in particular as a filler for closed spaced in vehicle parts. The pumpable thermally foaming filler composition is suitably used for the formation of an isolation wall in the closed spaces in which noise such as a wind noise arises during the operation of a car. Such closed spaces include in particular a front pillar (A pillar), a centre pillar (B pillar), a rear pillar (C pillar), a wheel arch (tire house) and a side sill.

The present application in a further embodiment is directed at a method for filling a closed space comprising the steps of applying a pumpable thermally foaming filler composition as described above into a closed space, and heating the closed space with the pumpable thermally foaming filler composition to a temperature above the activation temperature of the foaming agent to foam the filler.

For preferred embodiments of pumpable thermally foaming filler composition and the closed space in this method the abovementioned statements apply analogously.

Since the method is particularly useful in automobile fabrication, it is preferred for the method that the closed space is a closed space in a vehicle part. Moreover it is preferred that the closed space has a metal surface and in particular an oily metal surface.

In a yet further embodiment, the present application is directed at a vehicle part which is obtainable by the above-described method.

The pumpable thermally foaming filler composition of the present application provides good sealing to vehicle parts and thus significantly improves noise vibration harshness in a vehicle. In addition, the material of the present application has high volume expansion rates of from 500 to 900% and shows excellent adhesion on oiled metal substrates.

EXAMPLES

Each ingredient was compounded according to the compounding amount shown in Table 1. The Premix contains 12.9 wt.-% Styrene-Butadiene rubber, 26.8 wt.-% DIDP plasticizer, 39.9 wt.-% calcium carbonate filler and 20.4 wt.-% liquid epoxy resin (based on bisphenol A/epichlorhydrin with an epoxy equivalent weight of 180 to 190 g/eq).

TABLE 1

|  | 1 | 2 | 3 | 4 | 5 | 6 | 10 | 11 |
|---|---|---|---|---|---|---|---|---|
| Premix | 65.65 | 65.65 | 65.65 | 65.65 | 65.65 | 65.65 | 62.00 | 65.00 |
| DIDP plasticizer | 2.38 | 2.38 | 2.38 | 2.38 | 2.38 | 2.38 | 6.0 | 5.0 |
| PVC stabilizer | 1.9 | 1.9 | 1.9 | 1.9 | 1.9 | 1.9 | 1.0 | 1.0 |
| PVC-co-stabilizer | 1.9 | 1.9 | 1.9 | 1.9 | 1.9 | 1.9 | 1.2 | 0.5 |
| Calcium oxide | 2.85 | 2.85 | 2.85 | 2.85 | 2.85 | 2.85 | 2.0 | 2.0 |
| DER 331 liquid epoxy | 4.76 | 4.76 | 4.76 |  |  |  | 3.0 | 5.0 |
| DER 325 liquid epoxy |  |  |  | 4.76 | 4.76 | 4.76 |  |  |
| PVC homopolymer | 6.66 | 6.66 | 6.66 | 6.66 | 6.66 | 6.66 | 8.0 | 6.0 |

TABLE 1-continued

|  | 1 | 2 | 3 | 4 | 5 | 6 | 10 | 11 |
|---|---|---|---|---|---|---|---|---|
| PVC copolymer | 5.71 | 5.71 | 5.71 | 5.71 | 5.71 | 5.71 | 9.0 | 7.0 |
| Foaming agent | 3.14 | 4.13 | 5.13 | 3.14 | 4.13 | 5.13 | 2.5 | 5.5 |
| Dicyandiamide | 0.29 | 0.29 | 0.29 | 0.29 | 0.29 | 0.29 | 0.31 | 0.5 |
| Zinc oxide | 2.85 | 2.85 | 2.85 | 2.85 | 2.85 | 2.85 | 2.0 | 3.0 |
| Calcium carbonate | 1.9 | 1.9 | 1.9 | 1.9 | 1.9 | 1.9 | 3.0 | |

All amounts are in parts by weight

The obtained paste-like filler compositions were evaluated for adhesion and volume change under different bake-conditions.

Adhesion Test

A semicircular shape of the material to be tested, which had dimensions of 8 mm radius×100 mm length, was applied on a test metal substrate (hot-dip galvanized steel) with dimensions of 100×150×0.8 mm. Another piece of the same size metal was applied the material to form a sandwich with a 15 mm gap.

Subsequently, the sandwiched assembly is fastened by clips. The prepared assembly is then baked at the specified bake conditions. After 24 hours, the test assembly is peeled apart, and the percentage of adhesion failure of the material is checked to judge the adhesion. Cohesive failure (CF) indicates a failure in the bulk layer of the adhesive, whereas adhesive failure occurs at the interface between the adhesive and the adherend, or the material to be bonded.

Expansion in %

The Expansion is quantified for each sample by measuring the density of a bead of test material with approximately 5 mm radius and a length of 50 mm before and after expansion. The densities were determined according to DIN EN ISO 1183 using the water immersion method (Archimedes principle) in deionized water and a precision balance to measure the mass. The test materials were expanded at 180° C. for 15 minutes, 155° C. for 15 minutes and 200° C. for 30 minutes, respectively. As shown in Table 2, the pumpable thermally foaming filler composition of the invention shows excellent adhesion on foily metal substrates and high expansions of up to 900% depending on the amount of foaming agent used.

TABLE 2

|  | 15 min @ 180° C. | | 15 min @ 155° C. | | 30 min @ 200° C. | |
|---|---|---|---|---|---|---|
|  | Expansion % | Adhesion on CRS | Expansion % | Adhesion on CRS | Expansion % | Adhesion on CRS |
| 1 | 618 | 100% CF | 483 | 100% CF | 587 | 100% CF |
| 2 | 787 | 100% CF | 612 | 100% CF | 673 | 100% CF |
| 3 | 908 | 100% CF | 640 | 100% CF | 674 | 100% CF |
| 4 | 620 | 100% CF | 507 | 100% CF | 632 | 100% CF |
| 5 | 768 | 100% CF | 601 | 100% CF | 795 | 100% CF |
| 6 | 859 | 100% CF | 639 | 100% CF | 716 | 100% CF |
| 10 | 350 | 100% CF | 290 | 100% CF | 345 | 100% CF |
| 11 | 850 | 100% CF | 860 | 100% CF | 950 | 100% CF |

In a second set of experiments, the applicability of compositions which instead of polyvinylchloride contained an acrylic resin powder was investigated. As in the first set, a premix was used which contains 12.9 wt.-% Styrene-Butadiene rubber, 26.8 wt.-% DIDP plasticizer, 39.9 wt.-% calcium carbonate filler and 20.4 wt.-% liquid epoxy resin. This premix was compounded with several acrylic resins according to the compounding amounts shown in Table 3.

TABLE 3

|  | 7 | 8 | 9 |
|---|---|---|---|
| Premix | 60.86 | 60.86 | 60.86 |
| DIDP plasticizer | 8.43 | 8.43 | 8.43 |
| Liquid epoxy resin | 6.36 | 6.36 | 6.36 |
| Dianal LP-3106[1] | 14.53 | | |
| Kane Ace UC506[2] | | 14.53 | |
| Dianal LP-3202[1] | | | 14.53 |
| Foaming agent | 3.63 | 3.63 | 3.63 |
| Dicyandiamide | 0.55 | 0.55 | 0.55 |
| Calcium oxide | 2.73 | 2.73 | 2.73 |
| Zinc oxide | 2.91 | 2.91 | 2.91 |

All amounts are in parts by weight,
[1]= from Dianal America Inc.,
[2]= from Kaneka.

The compositions were subjected to the same investigation as indicated above in table 2. The results obtained in the investigation are provided in table 4 below.

TABLE 4

|  | 15 min @ 180° C. | | 15 min @ 155° C. | | 30 min @ 200° C. | |
|---|---|---|---|---|---|---|
|  | Expansion % | Adhesion on oiled HDG | Expansion % | Adhesion on oiled HDG | Expansion % | Adhesion on oiled HDG |
| 7 | 680 | 100% CF | 560 | 60% CF | 756 | 60% CF |
| 8 | 436 | 70% CF | 420 | 100% CF | 350 | 100% CF |
| 9 | n.d. | n.d. | 560 | 70% CF | 680 | 70% CF |

* = the samples were subjected to baking for 25 min @ 180° C. and 155° C. and for 50 Min @ 200° C.

As becomes evident from table 4, also the acrylic resin based materials provide suitable adhesion and expansion under all baking conditions.

The invention claimed is:

1. A pumpable thermally foaming filler composition comprising:
   10 to 20 wt.-% of a liquid epoxy resin,
   10 to 20 wt.-% of a polyvinylchloride resin and/or an acrylic resin powder,
   3 to 6 wt.-% of a foaming agent,
   5 to 10 wt.-% of a synthetic rubber,
   10 to 20 wt.-% of at least one plasticizer,
   less than 1 wt.-% of a curing agent for the liquid epoxy resin, and
   25 to 35 wt.-% of at least one filler.

2. A method for producing an article, the method comprising:
   inserting a pumpable thermally foaming filler composition into a closed space in the article, wherein the pumpable thermally foaming filler composition comprises:
   10 to 20 wt.-% of a liquid epoxy resin,
   10 to 20 wt.-% of a polyvinylchloride resin and/or an acrylic resin powder,
   3 to 6 wt.-% of a foaming agent,
   5 to 10 wt.-% of a synthetic rubber,
   10 to 20 wt.-% of at least one plasticizer,
   less than 1 wt.-% of a curing agent for the liquid epoxy resin, and
   25 to 35 wt.-% of at least one filler, and
   heating the closed space with the pumpable thermally foaming filler composition to a temperature above an activation temperature of the foaming agent to form a foamed filler within the closed space so as to produce the article.

3. A method of using a pumpable thermally foaming filler composition in forming an isolation wall in a closed space of at least one vehicle part, the method comprising:
   filling the closed space with the pumpable thermally foaming filler composition, wherein the pumpable thermally foaming filler composition comprises:
   10 to 20 wt.-% of a liquid epoxy resin,
   10 to 20 wt.-% of a polyvinylchloride resin and/or an acrylic resin powder,
   3 to 6 wt.-% of a foaming agent,
   5 to 10 wt.-% of a synthetic rubber,
   10 to 20 wt.-% of at least one plasticizer,
   less than 1 wt.-% of a curing agent for the liquid epoxy resin, and
   25 to 35 wt.-% of at least one filler, and
   heating the closed space with the pumpable thermally foaming filler composition to a temperature above an activation temperature of the foaming agent to form the isolation wall.

4. The method of claim 2, wherein the foamed filler has an expansion of more than 300% of its unfoamed volume.

5. The method of claim 2, wherein the article is a vehicle part.

6. The composition of claim 1, wherein the polyvinylchloride resin is a homopolymer or a copolymer.

7. The composition of claim 6, wherein the copolymer is a polymerization product of a vinyl ester and vinyl chloride.

8. The composition of claim 7, wherein the vinyl ester is vinyl acetate and/or vinyl propionate.

9. The composition of claim 1, wherein the liquid epoxy resin has an epoxy equivalent weight of from 180 to 190 g/eq.

* * * * *